Figure 2:
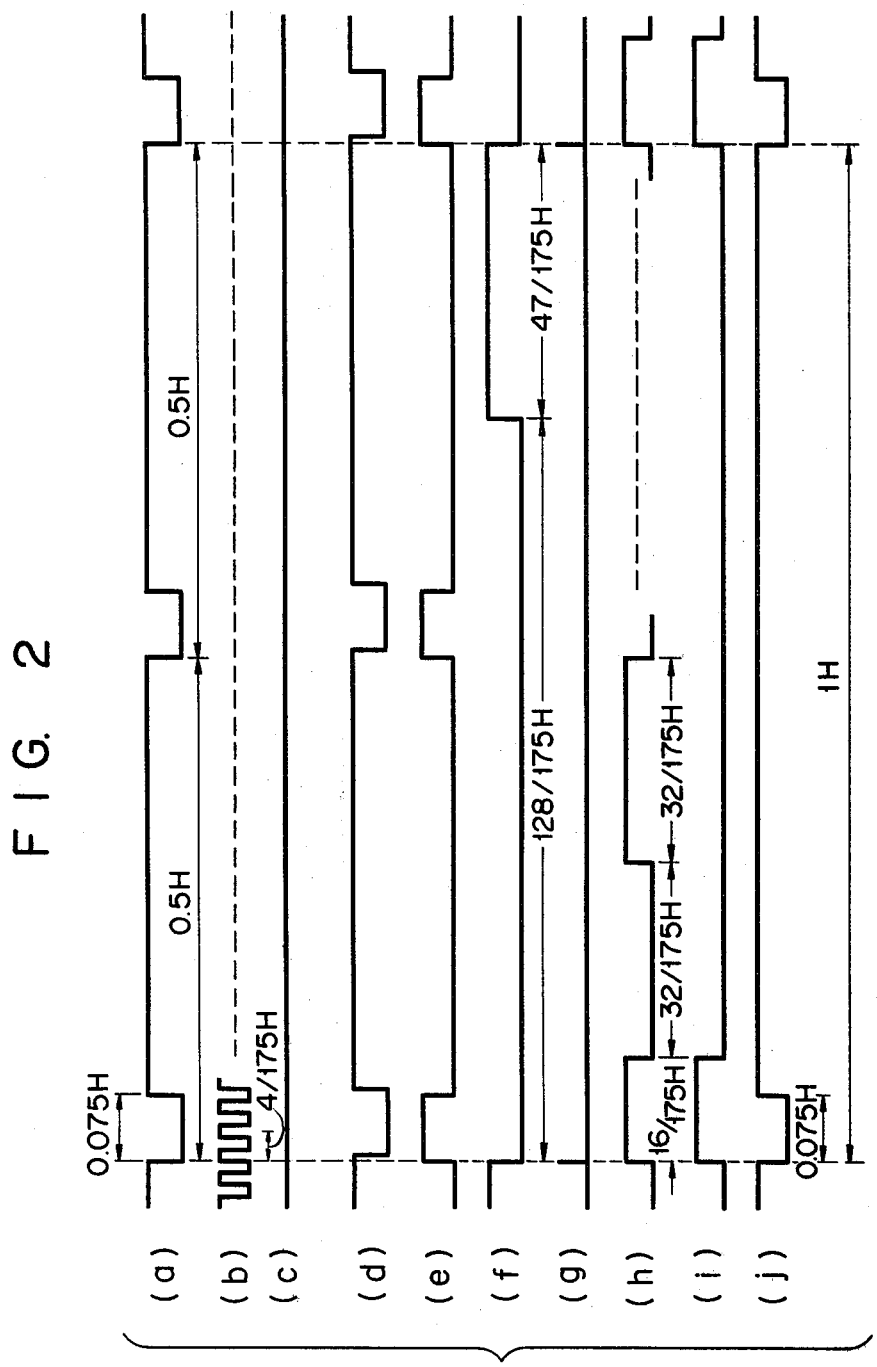

United States Patent [19]

Taguchi et al.

[11] 4,364,091
[45] Dec. 14, 1982

[54] EQUALIZING PULSE REMOVAL CIRCUIT

[75] Inventors: Shinichiro Taguchi; Nobuya Nagao; Yutaka Ogihara, all of Fukaya, Japan

[73] Assignee: Tokyo Shibaura Denki Kabushiki Kaisha, Kawasaki, Japan

[21] Appl. No.: 235,720

[22] Filed: Feb. 18, 1981

[51] Int. Cl.³ ............................................. H04N 5/04
[52] U.S. Cl. ..................................... 358/148; 358/319
[58] Field of Search ............... 358/148, 153, 160, 127, 358/154; 360/37, 33

[56] References Cited

U.S. PATENT DOCUMENTS 3,488,433 1/1970 Iwai et al. ............................ 360/37
3,963,865 6/1976 Songer ............................ 360/37 X Primary Examiner—Robert L. Richardson
Attorney, Agent, or Firm—Cushman, Darby & Cushman

[57] ABSTRACT

There are provided circuits for removing the equalizing pulses from the video signal. A composite sync signal separated from a video signal is applied to a gate circuit, so that only horizontal sync pulses are extracted. The gate pulse applied to the gate circuit is formed in the following manner. Clock pulses of a frequency 175/4 $f_H$ ($f_H$: a horizontal scanning frequency and about 15,734 KHz), for example, is frequency-divided into a signal of a frequency 175/256 $f_H$ by a frequency divider. A reset circuit processes the frequency-divided output signal, the delayed sync signal and the inverted composite sync signal to form pulses in synchronism with the horizontal sync pulses. The pulses thus obtained reset the frequency divider. At the same timing of the pulse generation from the reset circuit, a gate pulse generating circuit generates pulses whose pulse widths are longer than the pulse widths of the horizontal pulses, which in turn are applied as the gate pulse to the gate circuit.

2 Claims, 3 Drawing Figures

F I G. 1
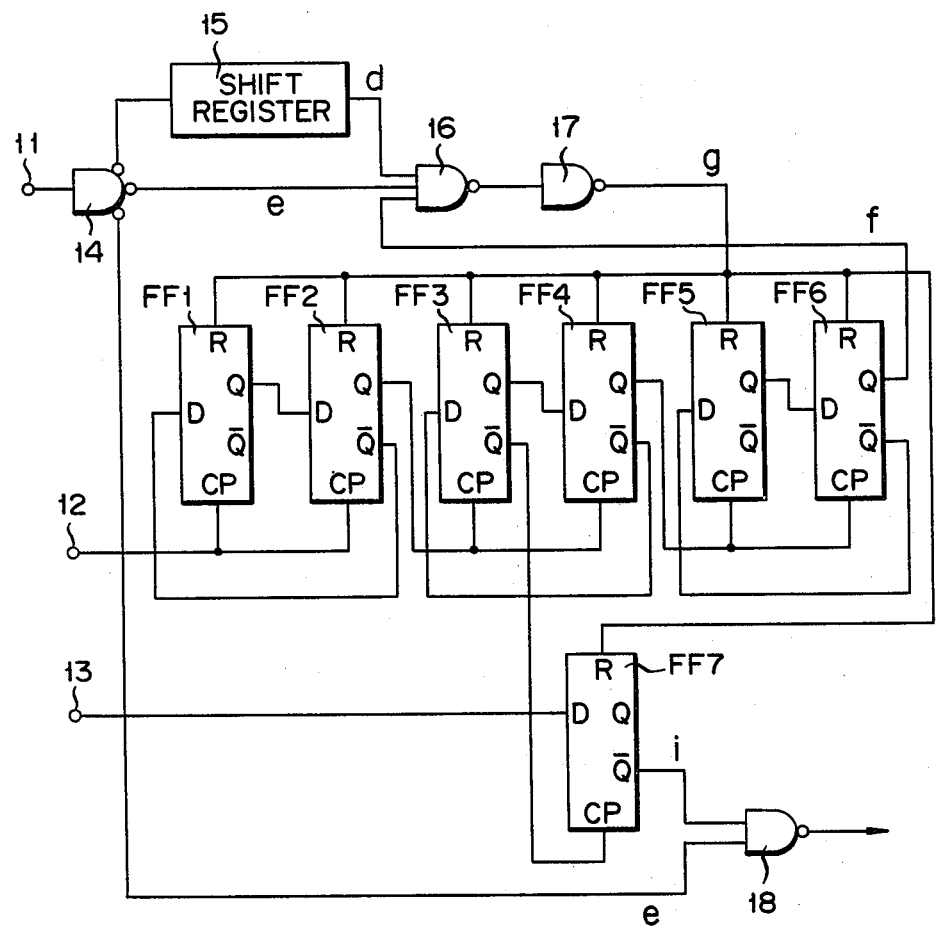

EQUALIZING PULSE REMOVAL CIRCUIT

The present invention relates to an equalizing pulse removal circuit well adaptable for a color signal processing circuit of a video tape recorder (referred to as a VTR).

In a VTR for processing a video signal by the NTSC system, for example, for recording the video signal on a magnetic tape, a color signal is converted into a low frequency signal in its subcarrier. For reproducing the video signal from the magnetic tape, the converted color signal is converted into the original high frequency signal in its subcarrier. The color signal with original high frequency subcarrier will be referred to as an original color signal (in the NTSC system, a color subcarrier frequency of the original color signal is about 3.58 MHz and designated as $f_0$). The color signal after frequency-converted into a low frequency signal will be called a converted color signal (in the NTSC system, a color subcarrier frequency of the converted color signal is approximately 688 KHz and designated as $f_1$).

In the color signal processing circuit, a record circuit section for processing signals relating to the recording operation is comprised of a circuit for forming a converting signal (frequency $f_0+f_1$) for converting the original color signal into the converted color signal and a circuit for forming the low frequency subcarrier ($f_1$) by using the converting signal ($f_0+f_1$) and the high frequency subcarrier ($f_0$).

Of those frequency components $f_0$ and $f_1$ in the converting signal ($f_1+f_0$), the frequency component $f_1$ must be as well known synchronized with the original video signal. Therefore, a circuit for forming the frequency component $f_1$ employs an automatic frequency control circuit (abbreviated as AFC) including a phase detecting circuit, voltage controlled oscillator (abbreviated as VCO) and the like, and obtains the frequency component $f_1$ from the VCO. An input signal to be compared for the phase detecting circuit is an output signal from the VCO, while a reference input signal for the phase detecting circuit generally is a horizontal sync pulse separated from the original video signal. Thus, in order to obtain the frequency component $f_1$ which is synchronized with the original video signal, there is required a circuit to provide accurate horizontal sync pulses.

The signals separated from the original video signal are vertical sync pulses, equalizing pulses and a color burst signal, in addition to the horizontal sync pulses. Incidentally those pulses cooperatively constitute a composite sync signal. For using the horizontal sync pulse, as one of the signal components of the composite sync signal, for the reference input of the AFC circuit, a circuit is required, which removes the equalizing pulse from the composite sync signal, pulse-shapes the vertical fly-back period, and successively provides horizontal sync pulses even during the vertical fly-back period. The circuit with such a function will be called an equalizing pulse removal circuit.

The conventional equalizing pulse removal circuit will be described in brief hereunder. The equalizing pulse removal circuit has first and second monostable multivibrators. The inverting time of the first monostable multivibrator is so selected to be between ½H and 1H. Here, H is a period of the horizontal sync pulse and about 63.5 μs. The composite sync signal is applied to the first monostable multivibrator. The inverting time of the second monostable multivibrator is selected to have 0.075H. An output signal of the first monostable multivibrator is applied to the second monostable multivibrator.

With this circuit arrangement, the output signal of the first monostable multivibrator is inverted in synchronism with only the horizontal sync pulse. Accordingly, pulses with the horizontal scanning period appears at the output terminal of the second monostable multivibrator.

The inverting time of the output signal of each monostable multivibrator is determined by a time constant of a time constant circuit in the monostable multivibrator. Therefore, when characteristics of circuit components, such as a resistor and a capacitor, of the time constant circuit go out of prescribed state in manufacturing or due to ambient temperature change. In this case, a pulse width of each monostable multivibrator output shifts from a desired value. Under this condition, undesirable cases frequently occur in the equalizing pulse removal circuit. For example, it fails to completely remove the equalizing pulses or to form the horizontal sync pulse with a desired width.

The circuit arrangement with a time constant circuit is sensitive to external noise and inductive action, and therefore is likely to operate erroneously. The conventional circuit arrangement includes at least two time constant circuits. When the circuit is fabricated into an integrated circuit, at least two connecting pins for external capacitor connections are needed, increasing the number of connecting pins.

An object of the present invention is to provide an equalizing pulse removal circuit which can reliably remove the equalizing pulse, can always obtain the horizontal sync pulse with a fixed pulse width, is insensitive to the induced noise and the inductive action from exterior, and is well suitable for IC fabrication.

To achieve the above object, there is provided an equalizing pulse removal circuit comprising: a first input terminal to which clock pulses with a higher frequency than the horizontal scanning frequency are applied; a frequency dividing circuit which frequency-divides the clock pulses applied to the input terminal into a signal with a pulse width larger than ½H but smaller than 1H; a second input terminal to which a composite sync signal separated from a video signal is applied; a delay circuit for delaying the composite sync signal applied to the second input terminal; an inverting circuit for inverting the composite sync signal applied to the second input terminal; a reset circuit which forms pulses synchronized with horizontal sync pulse in the composite sync signal by using the output signals from the frequency dividing circuit, the delay circuit and the inverting circuit and for resetting the frequency dividing circuit; a gate pulse generating circuit for forming a gate pulses with a fixed pulse width which is longer than the horizontal sync pulse width but shorter than ½H at the timing of the resetting of the frequency dividing circuit; a gate circuit for allowing the composite sync signal applied to the second input terminal to pass therethrough only during a period that the gate pulse generating circuit produces gate pulses.

Figure 3:
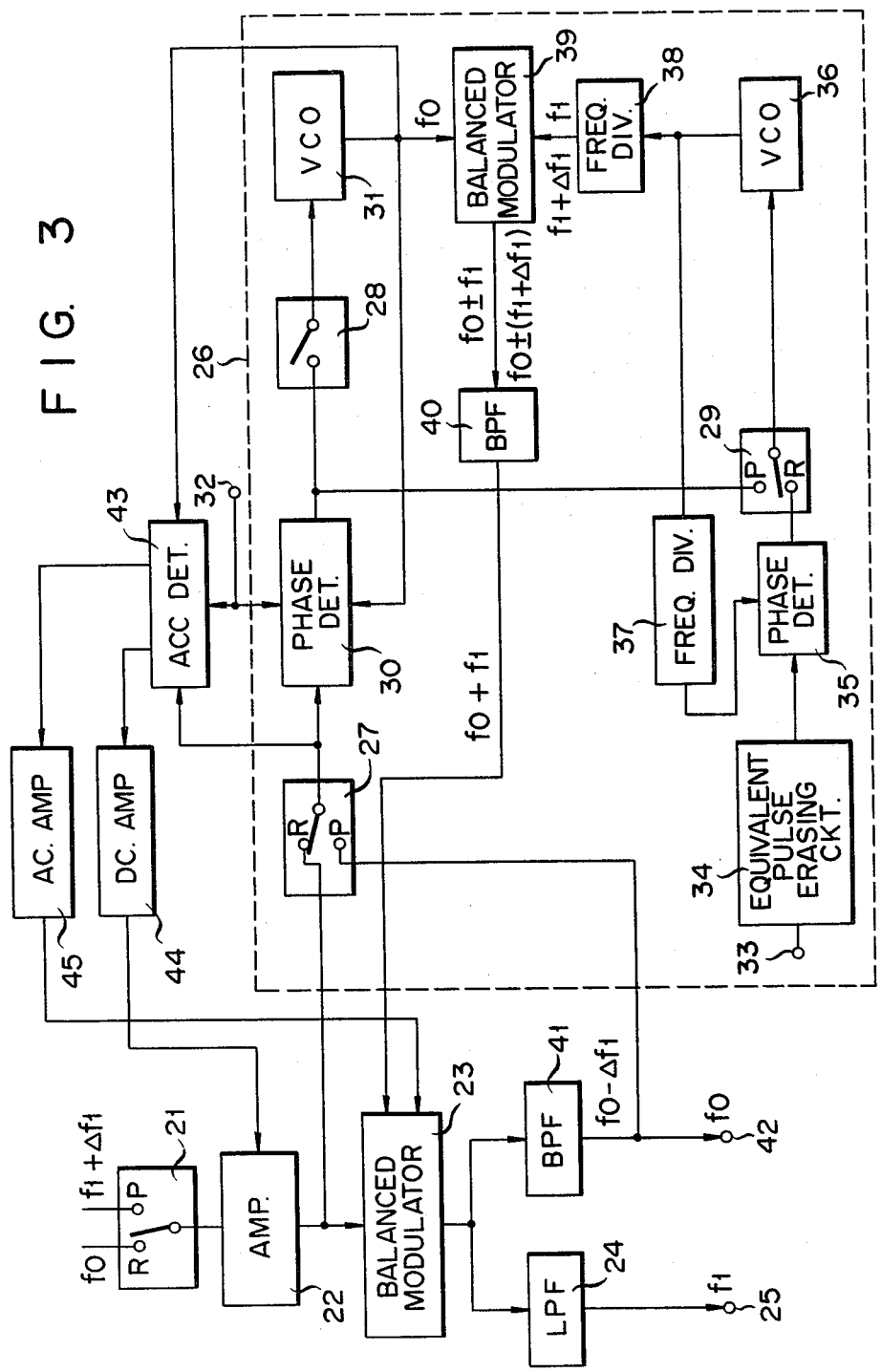

The present invention will be better understood when carefully reading from the following description taken in connection with the accompanying drawings, in which:

FIG. 1 is a circuit diagram of an embodiment of an equalizing pulse removal circuit according to the present invention;

FIGS. 2(a) to 2(j) are signal waveforms at respective portions useful in explaining the operation of the circuit shown in FIG. 1; and FIG. 3 is a circuit diagram of an example of the color signal processing circuit for VTR.

FIG. 1 is a circuit diagram of an equalizing pulse removal circuit which is an embodiment according to the present invention. In the figure, reference numeral 11 designates an input terminal of a composite sync signal separated from the original video signal. Numeral 12 designates an input terminal for clock pulse with a higher frequency than the horizontal scanning frequency. Numeral 13 is an input terminal for a fixed high level signal.

A first gate circuit 14 connected at the input terminal with the input terminal 11 for the composite sync signal has first to third output terminals. Of those output terminals of the first gate circuit 14, the first output terminal is connected through a shift register 15 to a first input terminal of a NAND circuit 16. The second output terminal is connected to a second input terminal of a NAND circuit 16. A third output terminal is connected to a second input terminal of a NAND circuit 18. The clock pulse input terminal 12 is connected to each clock pulse input terminal CP of D-type flip-flop circuits FF1 and FF2. An inverted output terminal $\overline{Q}$ of the D-type flip-flop circuit FF2 is connected to an input terminal D of the D-type flip-flop circuit FF2. A non-inverted output terminal Q of the D-type flip-flop circuit FF1 is connected to an input terminal D of the D-type flip-flop circuit FF1.

The non-inverted output terminal Q of the D-type flip-flop circuit FF2 is connected to each clock pulse input terminal CP of D-type flip-flop circuits FF3 and FF4. The inverted output terminal $\overline{Q}$ of the D-type flip-flop circuit FF4 is connected to an input terminal D of a D-type flip-flop circuit FF3. A non-inverted output terminal Q of a D-type flip-flop circuit FF3 is connected to an input terminal D of a D-type flip-flop circuit FF4.

The non-inverted output terminal Q of the D-type flip-flop circuit FF4 is connected to each clock pulse input terminal CP of D-type flip-flop circuits FF5 and FF6. The inverted output terminal $\overline{Q}$ of the D-type flip-flop circuit FF6 is connected to an input terminal D of the D-type flip-flop circuit FF5. The non-inverted output terminal Q of the D-type flip-flop circuit FF5 is connected to an input terminal D of the D-type flip-flop circuit FF6.

The non-inverted output terminal Q of the D-type flip-flop FF6 is connected to a third input terminal of the NAND circuit 16. The output terminal of the NAND circuit 16 is connected to an input terminal of a NAND circuit 17. The output terminal of the NAND circuit 17 is connected to the reset terminals R of the D-type flip-flops FF1 to FF7.

The D-type flip-flop circuit FF7 has an input terminal D connected to the high level signal input terminal 13. A clock pulse input terminal CP of the D-type flip-flop circuit FF7 is connected to the inverted input terminal $\overline{Q}$ of the D-type flip-flop circuit FF3. The inverted output terminal $\overline{Q}$ of the D-type flip-flop circuit FF7 is connected to a first input terminal of the NAND circuit 18.

In the first embodiment of the present invention thus constructed, the D-type flip-flops FF1 to FF6 constitute a frequency dividing circuit. The first output terminal of the first gate circuit 14 provides the input signal as it is. The second and third output terminals of the first gate circuit 14 provide the inverted input signals. The shift register 15 forms a delay circuit. The NAND circuits 16 and 17 form a reset circuit. The D-type flip-flop FF7 forms a gate pulse generating circuit. The NAND circuit 18 forms a second gate circuit. The clock pulse applied to the input terminal 12 is a signal of a frequency of $(44-\frac{1}{4})f_H$ ($f_H$: a horizontal scanning frequency and about 17.734 kHz) = $(175/4)f_H$, such as a signal which is synchronous with the horizontal sync pulse. In the case of the VTR of the β-type, the frequency $f_1$ of the low frequency subcarrier is generally set to $(175/4)f_H$. When the equalizing pulse removal circuit is used for the color signal processing circuit in the VTR of the β-type, the clock pulse applied to the input terminal 12 may be obtained from the VCO in the AFC circuit as mentioned above.

The operation of the equalizing signal removal circuit will be described referring to FIGS. 2(a) to 2(c). FIG. 2(a) shows a waveform of the composite sync signal applied to the composite sync signal input terminal 11. FIG. 2(b) shows a waveform of the clock pulse of the frequency $(175/4)f_H$ applied to the clock pulse input terminal 12. FIG. 2(c) shows a waveform of the high level input signal applied to the input terminal 13.

The clock pulse applied to the clock pulse input terminal 11 is frequency-divided into $(\frac{1}{4}) \times (44-\frac{1}{4})f_H$ by the D-type flip-flops FF1 and FF2, and is applied as clock pulses to the succeeding flip-flops FF3 and FF4. The clock pulse is further frequency-divided into a factor of four by the succeeding flip-flops FF3 and FF4, and is supplied as clock pulses to the flip-flops FF5 and FF6. The clock pulse of the frequency $(1/16) \times (44-\frac{1}{4})f_H$ is further frequency-divided into a factor of four by the D-type flip-flops FF5 and FF6. Accordingly, the output signals from the D-type flip-flop FF6 are clock pulses with 1/64 times of the frequency $(44-\frac{1}{4})f_H$ and with a pulse width of $(128/175)H$. The clock pulse from the flip-flop FF6 is illustrated in FIG. 2(f) and is applied to the third input terminal of the NAND circuit 16. The composite sync signal delayed by the shift register 15, which is illustrated in FIG. 2(d), and the inverted composite signal (FIG. 2(e)) are applied to the second and third input terminals of the NAND circuit 16, respectively. Those three signals are logically operated by the NAND circuits 16 and 17, so that the NAND circuit 17 produces at the output terminal pulses synchronizing at the trailing edge of the horizontal synchronizing pulse in the composite sync signal. The pulses from the NAND circuit 17 are used to reset the D-type flip-flop circuits FF1 to FF7.

FIG. 2(h) shows a waveform of the signal at the inverted output terminal Q of the D-type flip-flop circuit FF3. As shown, the waveform has high levels each lasting $(16/175)H$ at intervals of $(64/175)H$.

When the signal at the input terminal D of the D-type flip-flop circuit FF7 is always set to high level, after the NAND circuit 17 produces a reset pulse, the inverted output signal from the flip-flop FF7 continues high level during a period of $(16/175)H$ and then continues low level until the next reset pulse is introduced from the NAND circuit 17 into the flip-flop FF7. The inverted output signal from the D-type flip-flop FF7 is applied as a gate pulse to the NAND circuit 18. Therefore, only the horizontal sync pulses in the composite sync signal appear at the output terminal of the NAND circuit 18.

As described above, the equalizing pulse removal circuit as mentioned above uses the circuit components such as flip-flops and NAND circuits, despite the time constant circuit using the resistor and capacitor. Therefore, there is eliminated the disadvantages of the character change of the circuit components arising from temperature change or the change of its condition in the fabricating stage, and the high sensitivity to external noise or the inductive action. Therefore, the equalizing pulse removal circuit according to the present invention is always stable in the operation. Specifically, the frequency dividing circuit comprised of the D-type flip-flops FF1 to FF6 can always produce the frequency-divided output signal with a desired pulse width. Therefore, if the frequency dividing circuit is set to a proper value and the pulse width W (in the present embodiment, it is preset to (128/175)H) of the frequency dividing circuit is within a range defined by $\frac{1}{2}H<W<1H$, the reset pulse appearing at the output terminal of the NAND circuit 17 synchronizes only with the trailing edge of the horizontal synchronizing pulse in the composite sync signal. Therefore, the gate pulse derived from the D-type flip-flop circuit FF7 always synchronizes with the trailing edge of the horizontal synchronizing signal, too. Accordingly, when the pulse width of the gate pulse is preset to a proper value (in the present embodiment, it is preset to 16/175 (>0.075H) by taking advantage of the inverted output signal from the D-type flip-flop FF3), it is possible to exactly extract the horizontal synchronizing pulses with the original waveform from the composite sync signal. In other words, since a stable output signal can always be obtained from the frequency dividing circuit, the timing of the trailing edge of the horizontal synchronizing pulse by working out the logical product of the frequency-divided signal, the delayed composite sync signal and the inverted signal. Further, the gate pulse with a given pulse width is formed in synchronism with the trailing edge of the horizontal synchronizing pulse. Consequently, only the horizontal synchronizing pulse can be extracted from the composite sync signal.

Note here that the equalizing pulse removal circuit requires no time constant circuit, as mentioned above. Therefore, the equalizing pulse removal circuit may be fabricated into an IC with a less number of external pins.

The present invention is not limited to the above-mentioned embodiment. For example, the gate pulse generating circuit may be another circuit construction. The another gate pulse generating circuit uses a counter of which a period from the count start to end is longer than the horizontal synchronizing pulse width. The counter starts the count operation every time every reset pulse produced from the NAND circuit 17 and stops its count when it counts the final value.

Other changes and modifications of the present invention may be made within the scope of the present invention.

An example of the color signal processing circuit as mentioned above will be described referring to FIG. 3. In a recording mode, a first switch circuit 21 is switched to the input terminal R having an original color signal with high frequency subcarrier $f_0$. The original color signal is supplied through a first balanced modulator 23 via an automatic color control (ACC) amplifier circuit 22. The first balanced modulator 23 has been supplied with a converting signal with a frequency ($f_0+f_1$) from a converting signal generator 26 to be given later in detail. The first balanced modulator 23 makes a beat of both the signals $f_0$ and $f_0+f_1$ and produces the sum and subtraction signals $2f_0+f_1$ and $f_1$. Of those signal components, only the subtracted signal $f_1$ is extracted through a low-pass filter 24 and is generated from a recording color signal output terminal 25, as the low frequency converted color signal.

The operation of the converting signal generator 26 will be given in the recording mode. Second and fourth switch circuits 27 and 29 are switched to the input terminal R, and a third switch circuit 28 is set in ON state. Under this switching state, the output signal from the ACC amplifier 22 is supplied to a first phase detector 30 by way of the second switch circuit 27 which is supplied with an output signal from a first voltage controlled oscillator (VCO) 31. The oscillating frequency of the first VCO 31 is $f_0$. The phase detector 30 detects a phase difference between the output signal $f_0$ from the first VCO 31 and the output signal from the ACC amplifier 22 during a period that a gate pulse of the burst signal is applied to the input terminal 32. The output signal from the phase detector 30 is applied to the control terminal of the first VCO 31, through the third switch circuit 28. Therefore, the output signal $f_0$ from the first VCO 31 is synchronized with the burst signal of the original color signal.

The composite sync signal separated from the video signal is applied to the input terminal 33. The horizontal synchronizing pulse is obtained from the composite sync signal by an equalizing pulse removal circuit 34 as mentioned referring to FIG. 1. A second phase detector 35, a second VCO 36, and a frequency divider 37 cooperatively form an AFC circuit to produce a signal of frequency $f_1$. With such a construction, the oscillating signal from the second VCO 36 is synchronized with the horizontal synchronizing pulse in the composite sync signal.

The output signal from the second VCO 36 is applied as a signal of the frequency $f_1$ to a second balanced modulator 39, directly or after it is frequency-divided into a given frequency. The second balanced modulator 39 is further supplied with the output signal of $f_0$ from the first VCO 31. Thus, the second balanced modulator 39 makes a beat of the signal $f_0$ synchronized with the burst signal with the frequency-divided output signal of $f_1$ synchronized with the horizontal synchronizing pulse to produce the sum and subtraction signals $f_0+f_1$. Of those signal components, only the sum signal $f_0+f_1$ is allowed to path through a band-pass filter (BPF) 40. The output signal from the BPF 40 is applied as the converting signal to the first balanced modulator 23. In this way, the low frequency subcarrier ($f_1$) is formed.

In the reproduction or playback mode, the first switch circuit 21 is switched to the input terminal P having unstable low frequency subcarrier $f_1+\Delta f_1$ ($\Delta f_1$ indicates a frequency deviation component caused by time shift). The first balanced modulator 23 makes a beat of the low frequency converted signal with the unstable low frequency subcarrier $f_1+\Delta f_1$ reproduced from magnetic tape with the converting signal $f_0+f_1$ to produce signals with the sum and subtraction subcarrier components $f_0+2f_1+\Delta f_1$ and $f_0-\Delta f_1$. Only signal with the component $f_0-\Delta f_1$ is extracted by a band-pass filter (BPF) 41 and led to a playback color signal output terminal 42.

In this case, the converting signal generating circuit 26 operates as follows. The second and fourth switch circuits 27 and 29 are switched to the input terminals P and P, respectively. The third switch circuit 28 is rendered OFF, so that the first VCO 31 is set in a fixed oscillating mode. The output signal from the BPF 41 is supplied to the first phase detector 30 through the second switch circuit 27. The first phase detector 30 detects a phase difference between the output signal $f_0$ from the first VCO 31 and the output signal from the BPF 41, during the burst period. Accordingly, the first phase detecting circuit 30 produces a phase-detected signal $\Delta V$ corresponding to the frequency deviation component $\Delta f_1$. The voltage $\Delta V$ is supplied through the fourth switch circuit 29 to the control terminal of the second VCO 36. Therefore, the oscillating output signal from the second VCO 36 changes following the frequency deviation component $\Delta f_1$ of the signal $f_1 - \Delta f_1$. As a result, the signal of $f_1 + \Delta f_1$ is supplied from the frequency divider 38 to the second balanced modulator 39. The output signal $f_0$ from the first VCO 31 is also applied to the second balanced modulator 39. Thus, the second balanced modulator 39 produces signal with the frequency components $f_0 + f_1 + \Delta f_1$ and $f_0 - f_1 - \Delta f_1$ after both the signals are beated. The BPF 40 filters out only signal with the sum frequency component $f_0 + f_1 + \Delta f_1$ and applies it to the first balanced modulator 23. Accordingly, in the first balanced modulator 23, the unstabled low frequency subcarrier $f_1 + \Delta f_1$ and the frequency component $f_0 + f_1 + \Delta f_1$ are beated, so that the signal with the sum and subtraction subcarrier frequency components $f_0 + 2f_1 + 2\Delta f_1$ and $f_0$ appear at the output terminal. The BPF 41 filters out only signal with the component $f_0$. As a result, the playback standard color signal $f_0$ without the time shift component appears at the output terminal 42. In the figure, the circuit section including the ACC detector 43, a first DC amplifier 44 and the like form the called ACC circuit to control a gain of the ACC amplifier 22. A circuit section including the ACC detector 43 and a second DC amplifier 45 form the called color killer circuit to stop the operation of the color signal processing circuit when the color signal level is very small or in the white and black broadcasting mode.

What we claim is:

1. An equalizing pulse removal circuit comprising:
   a first input terminal to which clock pulses with a higher frequency than the horizontal frequency are applied;
   a frequency dividing circuit which frequency-divides the clock pulses applied to said input terminal into a signal with a frequency higher than $\frac{1}{2}$H but lower than 1H;
   a second input terminal to which a composite sync signal separated from a video signal is applied;
   a delay circuit for delaying said composite sync signal applied to said second input terminal;
   an inverting circuit for inverting said composite sync signal applied to said second input terminal;
   a reset circuit which forms pulses synchronized with horizontal synchronized pulse included in said composite sync signal by using the output signals from said frequency dividing circuit, said delay circuit and said inverting circuit and for resetting said frequency dividing circuit;
   a gate pulse forming circuit for forming gate pulses with a fixed pulse width which is longer than said horizontal synchronizing pulse width but shorter than $\frac{1}{2}$H at the timing of the resetting of said frequency dividing circuit; and
   a gate circuit for allowing the composite sync signal applied to said second input terminal to pass therethrough only during a period that said gate pulse forming circuit produces gate pulses.

2. An equalizing pulse removal circuit according to claim 1, wherein said frequency dividing circuit includes first and second D-type flip-flop circuits which receive at the clock pulse input terminals given clock pulses of about $174/4\ f_H$ and are so connected as the frequency-divide the received one into $\frac{1}{4}$ frequency, third and fourth D-type flip-flops which receive at the clock pulse input terminals the output signal from said first and second D-type flip-flops and are so connected as to frequency-divide the frequency divided one into $\frac{1}{4}$, and 5th and 6th D-type flip-flops which receive at the clock pulse input terminals the output pulses from said third and fourth D-type flip-flops and are so connected as to frequency-divide the received one into $\frac{1}{4}$ frequency; and said gate pulse forming circuit which always receives at the D input terminal a high level signal and at the clock pulse input terminal the inverted output signal from said third D-type flip-flop circuit.

* * * * *